United States Patent
Meininger et al.

[11] 4,033,980
[45] July 5, 1977

[54] PHTHALOCYANINE DYESTUFFS AND PROCESS FOR PREPARING THEM

[75] Inventors: Fritz Meininger, Frankfurt am Main; Klaus Hunger, Kelkheim, Taunus; Hartmut Springer, Frankfurt am Main, all of Germany

[73] Assignee: Hoechst Aktiengesellschaft, Frankfurt am Main, Germany

[22] Filed: Aug. 18, 1972

[21] Appl. No.: 281,790

Related U.S. Application Data

[63] Continuation of Ser. No. 851,091, Aug. 18, 1969, abandoned.

[52] U.S. Cl. .................. 260/314.5; 8/1 XA; 8/62; 260/242; 260/247.1 B; 260/293.61
[51] Int. Cl.² ............................ C09B 47/04
[58] Field of Search ................. 260/314.5

[56] References Cited

UNITED STATES PATENTS

| | | | |
|---|---|---|---|
| 3,062,320 | 11/1962 | Buc et al. | 260/314.5 |
| 3,268,548 | 8/1966 | Heyna et al. | 260/314.5 |
| 3,349,097 | 10/1967 | Kuhne et al. | 260/314.5 |
| 3,426,016 | 2/1969 | Springer et al. | 260/314.5 |

FOREIGN PATENTS OR APPLICATIONS 1,121,711 7/1968 United Kingdom ............ 260/314.5

OTHER PUBLICATIONS

Behnert, J. Society of Dyers & Colourists, vol. 75, Jan. 1960, pp. 581–585.

*Primary Examiner*—John D. Randolph
*Attorney, Agent, or Firm*—Curtis, Morris & Safford

[57] ABSTRACT

A water-soluble phthalocyanine dyestuff of the formula

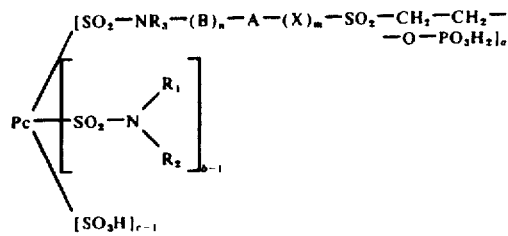

in which Pc represents copper phthalocyanine, nickel phthalocyanine or cobalt phthalocyanine, $R_3$ represents lower alkyl, B represents $-CH_2-CH_2-$, $-CH_2-CH_2-NH-$,

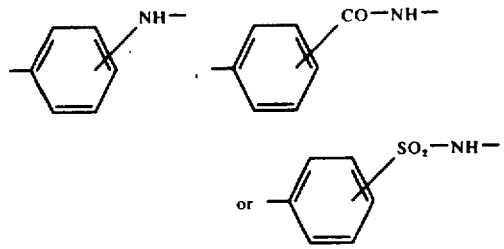

A represents phenylene or phenylene substituted by lower alkyl, lower alkoxy, carboxyl, hydroxyl, sulfo, nitro, chlorine or bromine, or naphthylene, X represents $-CH_2-$ or

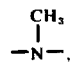

$R_1$ and $R_2$ each stand for hydrogen, lower alkyl, hydroxyethyl, sulfoethyl, carboxyethyl, benzyl, phenyl, carboxyphenylene or sulfophenylene, or together with the nitrogen atom piperidyl or morpholyl, $n$ and $m$ each represent 0 or 1, $a$, $b$ and $c$ each stand for a number from 1 to 4, the sum of $a$, $b$ and $c$ being at most 6, said dyestuff being suitable for the dyeing or printing of leather or textile materials consisting of native or regenerated cellulose, silk or polyamides, the dyeings and prints obtained on said materials being distinguished by deep tints and very good fastness properties to light and to wetting.

3 Claims, No Drawings

PHTHALOCYANINE DYESTUFFS AND PROCESS FOR PREPARING THEM

This is a continuation of application Ser. No. 851,091, filed Aug. 18, 1969, now abandoned.

The present invention relates to new water-soluble phthalocyanine dyestuffs having the general formula (1)

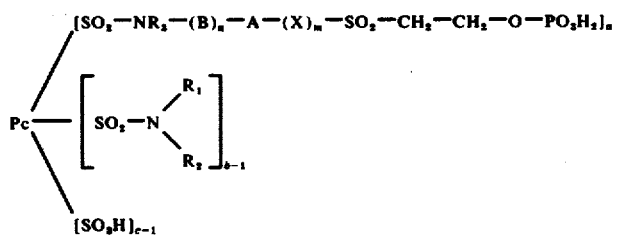

in which Pc stands for a phthalocyanine radical preferably containing metal such as copper, cobalt or nickel which radical may contain further substituents, for example phenyl groups or halogen atoms, $R_3$ represents an alkyl radical having from 1 to 4 carbon atoms, B represents a bivalent organic bridging member, for example

X represents the group $-CH_2-$ or

$R_1$ and $R_2$ represent each hydrogen atoms or alkyl or aryl groups that may be substituted or together with the nitrogen atom may form an alkylene imine ring which may contain hetero atoms, for example a piperidine or a morpholine ring, A represents a phenylene or naphthylene radical that may carry further substituents, for example alkyl, alkoxy, nitro, carboxyl, hydroxy or sulfonic acid groups or halogen atoms, n and m represent the integer zero or one, a, b and c are integers from 1 to 4 the sum of a, b and c being at most 6.

Moreover, this invention provides a process for preparing said dyestuffs.

The new phthalocyanine dyestuffs corresponding to the above-identified general formula (1) can be prepared a. by reacting phthalocyanine-sulfonic acid chlorides having the general formula (2)

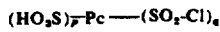

in which Pc is defined as above, p represents an integer from 0 to 3 and q represents integers from 1 to 4, the sum of p and q being at most 4, with amines of the general formula (3)

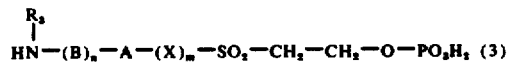

in which A, B, $R_3$, X, m and n are defined as above, if desired with addition of amines of formula (4)

$$H-N\begin{matrix}R_1\\ \\R_2\end{matrix} \qquad (4)$$

in which $R_1$ and $R_2$ have the meanings given above, in aqueous, aqueous-organic or organic media at pH values ranging from about 4 to about 11, preferably 4 to 9, at temperatures between about 0° and about 100° C, preferably 0° to 30° C, in the presence of an acid-binding agent or b. by converting phthalocyanine compounds of the general formula (5)

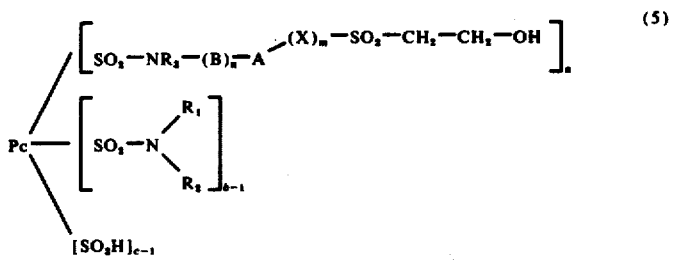

in which A, B, $R_1$, $R_2$, $R_3$, X, m, n, a, b and c have the meanings given above with phosphorylating agents in known manner into the corresponding phosphoric acid monoesters.

The reaction according to method (a) proceeds depending on the solubility of the reaction components in solution or suspension. In case in method (a) part of the sulfonic acid chloride groups of the starting compounds of formula (2) are to be converted into sulfonic acid groups, the condensation may be so conducted that concurrently with the reaction of the amines of formula (3) part of the sulfonic acid ester chloride groups are saponified or that the reaction is first performed with an amount of amines of formulae (3) and (4) insufficient for a complete reaction of all sulfonic acid chloride groups the reamining sulfonic acid chloride groups being saponified, subsequently, in a separate reaction step. As phthalocyanine sulfonic acid chlorides of formula (2) there may be used in the reaction according to method (a) for example sulfonic acid chlorides of metal-free phthalocyanines, preferably metalliferous phthalocyanines, for example, copperphthalocyanine-(3)-tetrasulfonic acid chloride, copperphthalocyanine-(3)-trisulfonic acid chloride, copper phthalocyanine-(3)-disulfonic acid chloride, nickel phthalocyanine-(3)-tetrasulfonic acid chloride, cobalt phthalocyanine-(3)-trisulfonic acid chloride, copper phthalocyanine-(4)-disulfonic acid chloride or copper phthalocyanine-(4)-tetrasulfonic acid chloride. However, also those sulfonic acid chlorides are appropriate the phthalocyanine nuclei of which carry further substituents, for example, sulfonic acid chlorides of tetraphenyl copper phthalocyanine or tetrachloronickel phthalocyanine or, for instance, copper-phthalocyanine-(3)-disulfonic acid chloride-disulfonic acid. The sulfonic acids chlorides cited are prepared in known manner e.g. according to the method disclosed in German Patent Specification 891 121.

As phosphoric acid monoesters of amines of formula (3) containing β-hydroxy-ethyl-sulfone groups the phosphoric acid monoesters of the following compounds may be named: β-hydroxyethyl-(3-aminophenyl)-sulfone, β-hydroxyethyl-(4-amino-phenyl)-sulfone, β-hydroxyethyl-[4-(N-methylamino)-phenyl]-sulfone, β-hydroxethyl-(3-amino-4-hydroxy-phenyl)-sulfone, β-hydroxyethyl-(3-amino-4-methoxy-phenyl)-sulfone, β-hydroxyethyl-(3-hydroxy-4-amino-phenyl)-sulfone, β-hydroxyethyl-(3-methoxy-4-amino-phenyl)-sulfone, β-hydroxyethyl-(3-amino-4-methyl-phenyl)-sulfone, β-hydroxyethyl-(3-amino-4-sulfone-phenyl)-sulfone, β-hydroxy-ethyl-(3-bromo-4-aminophenyl)-sulfone, β-hydroxyethyl-(3-amino-4-carboxy-phenyl)-sulfone, β-Hydroxyethyl-(2,5-dimethoxy-4-aminophenyl)-sulfone, β-hydroxyethyl-(2-methyl-4-amino-5-methoxy-phenyl)-sulfone, β-hydroxyethyl-[3-nitro-4-(4'-aminophenylamino)-phenyl]-sulfone, β-hydroxyethyl-[4-amino-naphthyl-(1)]-sulfone, β-hydroxyethyl-[5-amino-naphthyl-(1)]-sulfone, β-hydroxyethyl-[6-amino-naphthyl-(2)]-sulfone, β-hydroxyethyl-[3-(4'-aminobenzoylamino)-4-hydroxyphenyl]-sulfone, β-hydroxyethyl-[3-(4'-aminobenzoylamino)-phenyl]-sulfone, β-hydroxyethyl-[3-amino-4-hydroxy-5-nitrophenyl]-sulfone, β-hydroxyethyl-[4-(3'-amino-phenylsulfonylamino)-phenyl]-sulfone, 3-(N-methyl-N-isoethionylamino)-1-aminobenzene, 4-(N-methyl-N-isoethionylamino)-1-aminobenzene, 2-methoxy-4-(N-methyl-N-isoethionylamino)-1-aminobenzene, or β-hydroxyethyl-(3-amino-4-methoxy-benzyl)sulfone.

The phosphoric acid monoesters of the β-hydroxyethylsulfones mentioned can be prepared for example according to the process described in Houben-Weyl "Methoden der Organischen Chemie" Band 12/2, p. 147 et sec.). As suitable amines of formula (4) for example the following may be named:

ammonia, methylamine, ethylamine, n-butylamine, benzylamine, aniline, ethanolamine, dimethylamine, diethylamine, diisoproplamine-N-methylbenzylamine, N-methylaniline, piperidine, morpholine, diethanolamine, 2-aminoethane-1-sulfonic acid, 2-aminoethane-1-carboxylic acid, 4-aminobenzene-carboxylic acid, 3-amino-benzene-sulfonic acid or 4-aminobenzenesulfonic acid.

In carrying out the reaction according to method (a) in an aqueous or aqueous-organic medium it is advantageous to use as acid-binding agents hydroxides, carbonates or hydrocarbonates, secondary or tertiary phosphates, borates or acetates of metals of the first or third group of the periodic system, preferably sodium or potassium compounds and/or tertiary organic bases such, for example, as pyridine. For the reaction in organic media as acid-binding agents tertiary organic bases, such as dimethylaniline, pyridine or picoline are preferred.

Phosphorylating agents appropriate to be used according to method (b) are, for example, concentrated phosphoric acid pyrophosphoric acid, metaphosphoric acid or polyphosphoric acid, alkylesters or acid alkylesters of condensed phosphoric acids, mixtures of phosphoric acid with phosphorus pentoxide or phosphorus oxychloride.

The reaction of the phthalocyanine compounds of formula (5) with phosphoric acid or with the condensated phosphoric acids mentioned or alkylesters or acid alkylesters thereof, advantageously proceeds at an elevated temperature, preferably, between about 50° and about 150° C in an excess of one of the phosphorylating agents mentioned in order to reduce the formation of phosphoric acid diesters as far as possible. The esterification may also take place in the presence of inert solvents or diluents, for example, toluene. Chlorobenzene or chloronaphthalene. When using condensated phosphoric acids or alkylesters or acid alkylesters thereof it may be advantageous to subject, subsequently, the reaction mixture obtained to hydrolysis under mild conditions, for example with hot water in order to convert the pyrophosphoric or polyphosphoric monoesters formed as by-products into phosphoric acid monoesters.

The reaction of the phthalocyanine compounds of formula (5) with phosphorus oxychloride is, advantageously, performed with exclusion of moisture in excess phosphorus oxychloride while cooling or moderately heating, if desired, in the presence of a tertiary amine, for example pyridine lutidine or diemthylaniline and/or another solvent or diluent, e.g. benzene or chlorobenzene. It is advantageous to continuously remove the hydrogen chloride formed in the reaction by slightly evacuating the reaction vessel, or by passing an inert gas through the reaction mixture.

In the reaction of the phthalocyanine compounds of formula (5) with phosphorus oxychloride first phosphoric acid monoester dichlorides of the said compounds are formed which may be mixed with phosphoric acid diester chlorides that must be saponified subsequently in a second reaction step. The saponification advantageously takes place, for example, in water, dilute acids or bases while cooling, at room temperature, or while heating.

The phthalocyanine compounds of formula (5) may be obtained by known methods, for example according to those described in German Pats. 1,179,317 or 1,238,136 or by the process of Belgian Pat. No. 674,683.

The new phthalocyanine dyestuffs of the invention are according to both methods described isolated by salting out, for example with sodium chloride or potassium chloride and/or by acidifying with an inorganic acid or by concentrating the neutral or weakly acid aqueous dyestuff solutions, preferably at moderately elevated temperature under reduces pressure. The new phthalocyanine dyestuffs of the invention are suited for dyeing or printing fibrous materials consisting of wool, silk or linear polyamides, in particular materials containing hydroxyl groups, for example, cellulose, such as linen, regenerated cellulose, especially cotton and, furthermore leather.

The materials are dyed for example by direct dyeing methods in dyebaths containing alkaline agents and, optionally, inorganic salts, for example, alkali metal chlorides or sulfates at room temperature or elevated temperature, for example between about 50° and about 100° C. In case the dyestuffs have no or poor affinity to the fibre it is, advantageously, proceeded as follows: The fibrous material is impregnated with aqueous dyestuff solutions that may contain alkaline agents and inorganic salts, in the cold or at moderate temperatures, squeezed off and the applied dyestuffs are fixed, if desired, after intermediate drying.

In case the padding liquor employed contains an alkaline agent, the subsequent fixation is effected, for example, by steaming, thermofixing or storing the impregnated material for several hours. The choice of the fixing method depends upon the type and quantity of the alkaline agent used.

When impregnating baths not containing alkaline agents are used the impregnated fabrics are subsequently first introduced, for example into a saltcontaining alkaline bath and subjected afterwards to one of the filtering procedures described.

As alkaline agents alkali metal hydroxides, carbonates, bicarbonates, phosphates, borates or silicates or alkali metal salts of trichloroacetic acid or mixtures of said compounds are preferred.

For the application in the printing of textiles the new dyestuffs are dissolved in water, if desired, with addition of known auxiliaries, for example, urea or dispersing agents and stirred with thickeners, for example, methyl cellulose or aliginate thickenings. To the so-obtained pastes the mentioned alkalies are added and the goods are printed in known manner the material being then fixed by steaming or thermofixing in usual manner.

The fibrous materials can also be printed with neutral or weakly acid printing pastes not containing alkaline agents. In this case they are subjected prior to printing or subsequently thereto to treatment with alkaline agents consisting, for example, in passing the material shortly through a saliferous alkaline solution and subjecting, subsequently, to one of the fixing procedures described. Another way of accomplishing the fixation in a very simple manner is to pass the printed material through a hot salt-containing alkaline solution.

The new dyestuffs yield on the materials mentioned deep dyeings are prints exhibiting very good fastness to light and wet processing.

In comparison with the dyestuffs disclosed in German Pat. Nos. 1,179,317; 1,238,136 and in Belgian Pat. No. 674,683 having the most closely related structure the new phthalocyanine dyestuffs possess better solubility. They are, above all, superior with respect to better stability of the alkaline dyebaths and printing pastes.

The following Examples illustrate the invention but they are not intended to limit it thereto the parts and percentages being by weight unless otherwise stated.

EXAMPLE 1

11.2 parts of β-hydroxyethyl-(4-amino-phenyl)-sulfone phosphoric acid monoester were dissolved in 50 parts of water by cautiously adding 20 parts by volume of 2N sodium hydroxide solution. Into the so-obtained solution at 20° C with vigorous stirring 19.4 parts of copper phthalocyanine-(3)-tetrasulfonic acid chloride were introduced as moist filter cake. Thereupon, 1 part of pyridine was added and the pH was during the thus initiated reaction maintained between 5.5 and 5.7 by strewing into the reaction mixture about 9 parts of sodium bicarbonate. After completion of the reaction, the obtained dyestuff solution was adjusted to a pH of 2 with hydrochloric acid, the dyestuff was precipitated by salting out with sodium chloride and potassium chloride, filtered off and washed with sodium chloride solution. After drying, 44 parts of a saliferous, turquoise blue dyestuff were obtained which according to analysis correspond in its composition approximately to the formula

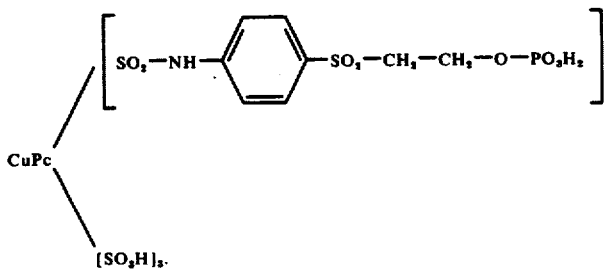

Said dyestuff yielded on cotton fabrics in the presence of alkaline agents brilliant turquoise blue dyeings showing good fastness to light, rubbing and wet processing. Dyestuffs having similar properties were obtained, when in the preceding Example instead of β-hydroxyethyl-(4-amino)-phenylsulfone phosphoric acid monoester equivalent amounts of phosphoric acid monoesters of the following β-hydroxyethyl sulfones were used:

β-hydroxyethyl-(3-amino-phenyl)-sulfone, β-hydroxyethyl-(2-amino-phenyl)-sulfone, β-hydroxyethyl-[4-(N-methylamino)-phenyl]-sulfone, β-hydroxyethyl-(3-amino-4-hydroxy-phenyl)-sulfone, β-hydroxyl-(3-amino-4-methoxy-phenyl)-sulfone, β-hydroxyethyl-(3-hydroxy-4-amino-phenyl)-sulfone, β-hydroxyethyl-(3-methoxy-4-amino-phenyl)-sulfone, β-hydroxyethyl-(3-amino-4-methyl-phenyl)-sulfone, β-hydroxyethyl-(3-amino-4-sulfo-phenyl)-sulfone, β-hydroxyethyl-(3-bromo-4-aminophenyl)-sulfone, β-hydroxyethyl-(3-amino-4-carboxy-phenyl)-sulfone, β-hydroxyethyl-(2,5-dimethoxy-4-amino-phenyl)-sulfone, β-hydroxyethyl-(2-methyl-4-amino-5-methoxy-phenyl)-sulfone, β-hydroxyethyl-[3-nitro-4-(4'-aminophenylamino)-phenyl]-sulfone, β-hydroxyethyl-[4-amino-naphthyl-(1)]-sulfone, β-hydroxyethyl-[5-amino-naphthyl-(1)]-sulfone, β-hydroxyethyl-[6-amino-naphthyl-(2)]-sulfone, β-hydroxyethyl-[3-(4'-aminobenzoylamino)-4-hydroxyphenyl]-sulfone, β-hydroxyethyl-[3-(4'-aminobenzoylamino)-phenyl]sulfone, β-hydroxyethyl-(3-amino-4-hydroxy-5-nitro-phenyl)-sulfone, β-hydroxyethyl-[4-(3'-aminophenylsulfonylamino)-phenyl]-sulfone or β-hydroxyethyl-(3-amino-4-methoxy-benzyl)-sulfone.

EXAMPLE 2

16.9 parts of β-hydroxyethyl-(4-amino-phenyl)-sulfone phosphoric acid monoester were dissolved in 50 parts of water by cautious addition of 30 parts by volume of 2N sodium hydroxide solution. Into the so-obtained solution, at 20° C with vigorous stirring, 19.3 parts of nickelphthalocyanine-(3)-tetrasulfonic acid chloride were introduced as moist filter cake. After 1 part of pyridine had been added, the pH of the reaction mixture was maintained during the thus initiated reaction between 5.5 and 6 by strewing into the reaction mixture about 8 parts of sodium bicarbonate. On completion of the reaction, the obtained dyestuff solution was evaporated to dryness in a spray-drying device. 40 parts of a saliferous, turquoise blue dyestuff were obtained which corresponded in its composition approximately to the formula

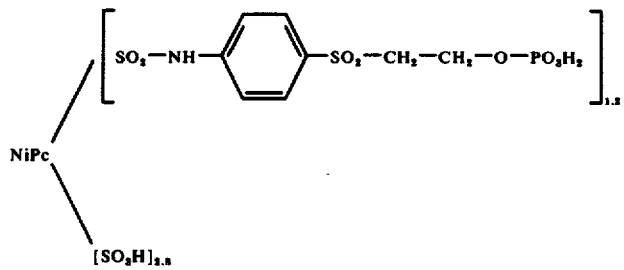

It yielded on cotton fabrics in the presence of alkaline agents greenish blue dyeings of excellent fastness to light, rubbing and wet processing.

When in the preceding example instead of nickelphthalocyanine-(3)-tetrasulfonic acid chloride an equivalent amount of cobalt phthalocyanine-(3)-tetrasulfonic acid chloride or copper phthalocyanine-(3)-tetrasulfonic acid chloride was used, dyestuffs having similar properties were obtained.

EXAMPLE 3

16.9 parts of β-hydroxyethyl-(3-amino-phenyl)-sulfone phosphoric acid monoester were dissolved in 50 parts of water by cautious addition of 30 parts by volume of 2N sodium hydroxide solution. Into the so-obtained solution, at 20° C with vigorous stirring, 15.9 parts of copper phthalocyanine-(3) sulfonic acid chloride containing on an average 2.2 sulfonic acid chloride groups were introduced as moist filter cake. After 1 part of pyridine had been added, there was maintained during the thus initiated reaction of pH between 5.5 and 6 by strewing into the reaction mixture about 5 parts of sodium carbonate.

After completion of the reaction the obtained dyestuff solution was mixed with sodium chloride; the precipitated dyestuff was filtered off, washed with sodium chloride solution and dried. 57 parts of a saliferous turquoise blue dyestuff were obtained corresponding in its composition approximately to the formula

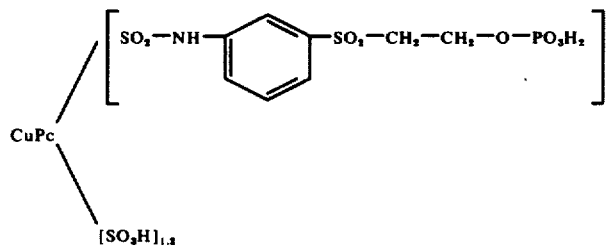

said dyestuff was suitable for dyeing or printing fabrics of native or regenerated cellulose in the presence of alkaline agents and yielded highly brilliant dyeings and prints showing very good fastness to light and wet processing.

When, in the preceding Example instead of β-hydroxyethyl-(3-amino-phenyl)-sulfone phosphoric acid monoester an equivalent amount of β-hydroxyethyl-(4-amino-phenyl)-sulfone phosphoric acid ester was used, a turquoise blue dyestuff with analogous properties was obtained.

EXAMPLE 4

16.8 parts of β-hydroxyethyl-(4-amino-phenyl)-sulfone phosphoric acid monoester were dissolved in 50 parts of water by cautiously adding 30 parts by volume of 2N sodium hydroxide solution. Into this solution at 15° C, with thorough stirring, 19.4 parts of copper phthalocyanine-(3)-tetrasulfonic acid were introduced as moist filter cake. After addition of 1 part of pyridine, the pH was during the thus initiated reaction maintained between 5.5 – 5.7 by stirring into the reaction mixture about 75 parts in total of aqueous 2N ammonia. On completion of the reaction the obtained dyestuff solution was adjusted to a pH of 3 by means of hydrochloric acid and the dyestuff was salted out with potassium chloride and sodium chloride. For purification the dyestuff obtained could be redissolved in water and salted out again. After drying, 59 parts of a saliferous turquoise blue dyestuff were obtained which corresponded in its composition approximately to the formula

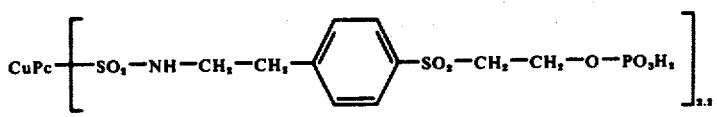

mula

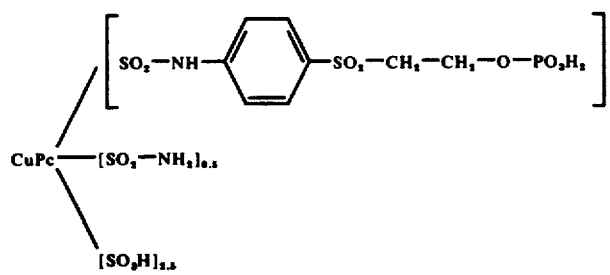

It yielded on cotton fabrics in the presence of alkaline agents, brilliant turquoise blue dyeings of very good fastness to light.

When in the preceding Example instead of β-hydroxyethyl-(4-amino-phenyl)-sulfone phosphoric acid monoester an equivalent amount of 3-(N-methyl-N-isoethionyl-amino)-1-aminobenzene, 4-(N-methyl-N-isoethionylamino)-1-aminobenzene or 2-methoxy-4-(N-methyl-N-isoethionylamino)-1-aminobenzene phosphoric acid monoester were used dyestuffs having similar properties were obtained.

EXAMPLE 5

10 parts of the phthalocyanine dyestuff of formula

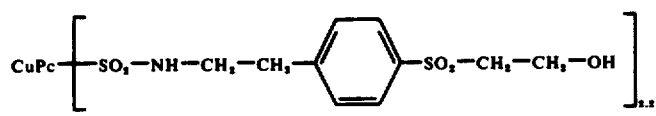

were introduced into 50 parts of pyrophosphoric acid with vigorous stirring. Stirring was continued for one hour at 100° C, whereupon the reaction mixture was poured while still hot and while stirring into a mixture of sodium chloride solution and ice at a temperature not exceeding +10° C. Thereby the phosphoric acid ester precipitated. Stirring was continued for some time, the ester dyestuff was filtered off and washed with sodium chloride solution. The moist filter cake was dissolved in 300 parts of water, the pH of the solution was adjusted to 4.5 by addition of 4 parts of crystalline tertiary sodium phosphate and the ester dyestuff was once more precipitated by salting out with sodium chloride. After filtering and drying, 27 parts of a saliferous dyestuff corresponding to the formula were obtained which dissolved very easily in water and yielded on cotton fabrics when applied according to the two-bath method appropriate for reactive dyestuffs turquoise blue shades having excellent fastness to wet processing. The dyestuff was furthermore highly suitable as printing dyestuff.

EXAMPLE 6

6.1 parts of phosphorus oxychloride were added dropwise at a temperature below 10° C to 20 parts of pyridine. Into this mixture at 10° to 20° C, 12.2 parts of the phthalocyanine dyestuff of formula

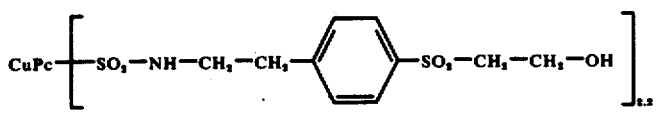

were introduced with vigorous stirring. The batch was stirred for 3 hours at 70° C. The melt obtained was poured while stirring onto 300 parts of pulverized ice at a temperature not exceeding +5° C. Stirring was continued for several hours while cooling with ice and for several hours at room temperature and the precipitated dyestuff was filtered off. The moist filter cake was dissolved for purification in about 500 parts of water and the dyestuff was isolated by salting out. After drying, 22 parts of saliferous, blue dyestuff of formula

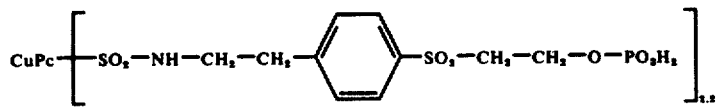

were obtained which yielded on cotton and cellulose in the presence of alkaline agents dyeings with very good fastness properties. Particularly, in the printin of textiles according to the two-bath process very deep dyeings and prints fast to wet were produced with said dyestuff.

A dyestuff having similar properties was obtained, when in the preceding Example as starting substance 11.6 parts of the dyestuff of formula

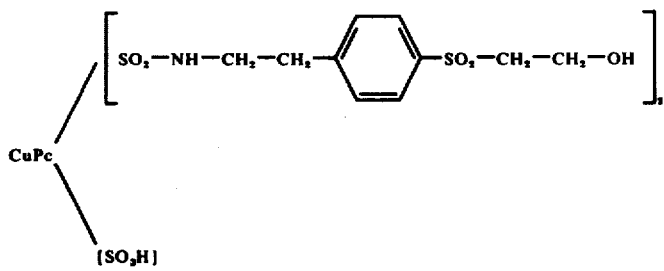

were used.

EXAMPLE 7

13.5 parts of the phthalocyanine dyestuff of formula

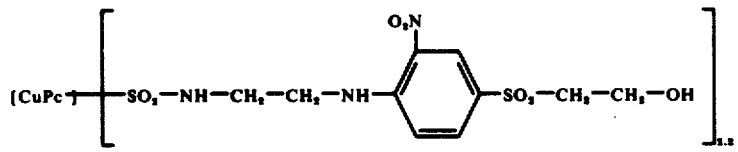

were introduced into 100 parts of pyrophosphoric acid. The batch was heated to 100° C at which temperature it was stirred for one hour, whereupon it was poured while hot onto a mixture of ice and saturated sodium chloride solution at a temperature not exceeding +5° C. Stirring was continued for some time, the precipitated ester dyestuff was filtered off and washed with saturated sodium chloride solution. Subsequently, the moist filter cake was dissolved in 500 parts of water, the pH of the solution was adjusted to 5 by addition of sodium phosphate and the dyestuff was isolated by salting out with sodium chloride. After drying, 27 parts of a saliferous dyestuff of formula

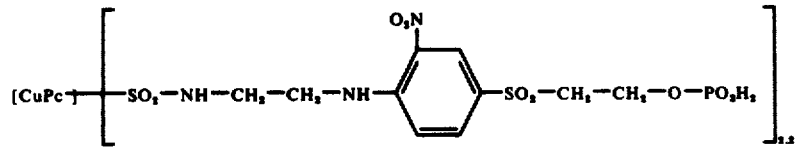

were obtained which yielded on cotton fabrics under the action of alkaline agents bluish green shades very fast to light and wetting.

A dyestuff with similar properties somewhat more yellowish in shade was obtained, when in the preceding example as starting substance 19.8 parts of the dyestuff of formula

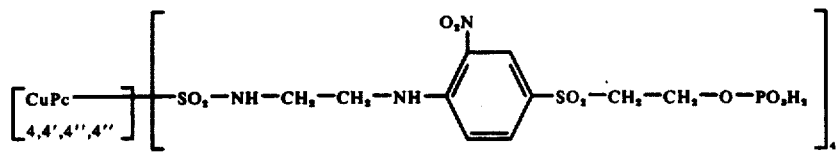

were used.

EXAMPLE 8

16.9 parts of β-hydroxyethyl-(3-amino-phenyl)-sulfone phosphoric acid monoester corresponding to the formula

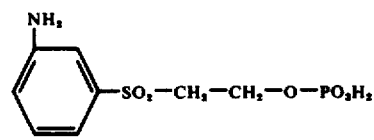

were dissolved in 50 parts of water by addition of 30 parts by volume of 2N sodium hydroxide solution. Into this solution at 15° C, 19.4 parts of copper phthalocyanine-(3)-tetrasulfonic acid chloride were introduced with good stirring at moist filter cake adding, subsequently thereto 1 part of pyridine, furthermore 10 parts by volume of 2N ammonia solution in such a manner that the pH of the reaction mixture was maintained between 8 and 8.5.

When the ammonia solution was consumed, a 2N sodium hydroxide solution was added dropwise until completion of the reaction up to the pH mentioned. The obtained dyestuff solution was, subsequently, weakly acidified, the dyestuff precipitated by salting out with sodium chloride, filtered and dried. 58% of a saliferous, turquoise blue dyestuff were obtained which was suitable for dyeing or printing native or regenerated cellulose in the presence of alkaline agents. The dyeings and prints produced with said dyestuff showed very good fastness to light and did not stain.

Dyestuffs having similar good properties were obtained, when in the preceding Example instead of aqueous ammonia solutions of an equivalent amount of the following amines were used: Methylamine, ethylamine, n-butylamine, benzylamine, aniline, ethanolamine, dimethylamine, diethylamine, di-isopropylamine, n-methylbenzylamine, N-methylaniline, piperidine, morpholine, diethanolamine, 2-aminoethane-1-carboxylic acid, 2-amninoethane-1-sulfonic acid, 4-aminobenzene-carboxylic acid, 3-aminobenzene-sulfonic acid or 4-aminobenzene-sulfonic acid.

When in the preceding Example instead of copperphthalocyanine-(3)-tetra-sulfonic acid chloride an equivalent amount of tetraphenyl copper phthalocyanine-tetrasulfonic acid chloride was used, a bluish green dyestuff with similar dyeing properties was obtained.

EXAMPLE 9

75 parts of the phthalocyanine dyestuff of formula

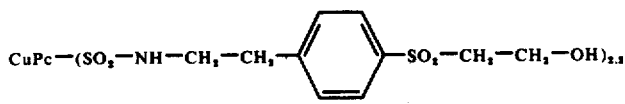

were introduced into 375 parts of polyphosphoric acid having a $P_2O_5$ content of 84% at 100° C at which temperature the batch was stirred for 1 hour, allowed to cool a little, whereupon at 80° – 100° C, 560 parts of water were slowly added refluxing then for one hour. The batch was allowed to cool to room temperature, the precipitated dyestuff was filtered off and washed with water until the filtrate began to assume a blue coloration. The moist filter residue was dissolved in 400 parts of water with addition of 10 parts of potassium bicarbonate and the obtained solution was evaporated to dryness. 83 parts of a blue dyestuff were obtained corresponding in its composition and properties to the dyestuff of Example 5.

The same dyestuff was obtained, when in the preceding Example instead of 375 parts of polyphosphoric acid (84% $P_2O_5$) the same amount by weight of acid polyphosphoric acid methyl ester having a $P_2O_5$ content of 76.8% and a methyl content of 1.5 % were used and the reaction mixture was stirred for 2 hours at 130° – 135° C instead of stirring for one hour at 100° C the further procedure being as described above.

We claim:

1. A water-soluble phthalocyanine dyestuff of the formula

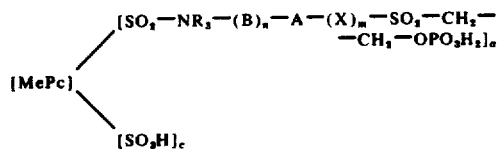

wherein MePc is copper phthalocyanine, nickel phthalocyanine or cobalt phthalocyanine and wherein the sulfonic acid and the sulfonamide groups are linked to the 3-position or the 4-position of the phthalocyanine benzene rings, $a$ and $c$ each is an integer or a fractional number in the range 1 to 3, the sum of $a$ and $c$ being at most 4, $R_3$ is hydrogen or methyl, B is $-CH_2-CH_2-$, $-CH_2-CH_2-NH-$,

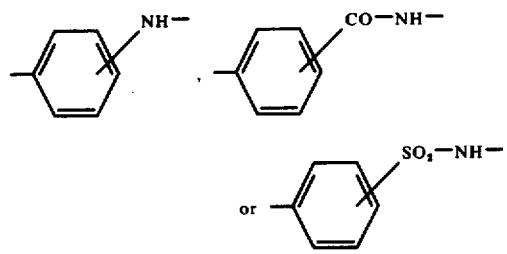

A is phenylene, naphthylene, hydroxyphenylene, methoxyphenylene, methylphenylene, dimethoxyphenylene, methyl-methoxyphenylene, sulfo-phenylene, carboxy-phenylene, bromo-phenylene, nitrophenylene or hydroxy-nitro-phenylene, X is $-CH_2-$ or $-N(CH_3)-$ and $n$ and $m$ each is 0 or 1, the sum of $m$ and $n$ being 0 or 1.

2. The dyestuff according to claim 1 of the formula

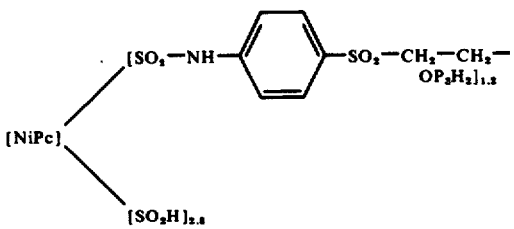

wherein the sulfonic acid and the sulfonamide groups are at the 3-positions.

3. The dyestuff according to claim 1 of the formula

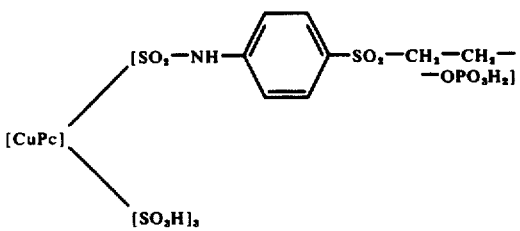

wherein the sulfonic acid and the sulfonamide groups are at the 3positions.

* * * * *